United States Patent
Morita et al.

(10) Patent No.: US 9,602,712 B2
(45) Date of Patent: Mar. 21, 2017

(54) COMMUNICATION APPARATUS THAT SENDS SIGNAL FOR INSTRUCTING IMAGE PICKUP APPARATUS TO EXECUTE SHOOTING OPERATION AND COMMUNICATION CONTROL METHOD THEREFOR

(71) Applicant: CANON KABUSHIKI KAISHA, Tokyo (JP)

(72) Inventors: Takuro Morita, Tokyo (JP); Junji Takai, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 40 days.

(21) Appl. No.: 13/719,483

(22) Filed: Dec. 19, 2012

(65) Prior Publication Data

US 2013/0155267 A1    Jun. 20, 2013

(30) Foreign Application Priority Data

Dec. 19, 2011    (JP) .................................. 2011-277059

(51) Int. Cl.
*H04N 5/232*    (2006.01)
*H04N 5/228*    (2006.01)
(Continued)

(52) U.S. Cl.
CPC ........... *H04N 5/23209* (2013.01); *G03B 9/70* (2013.01); *G03B 15/05* (2013.01); *H04N 5/2256* (2013.01);
(Continued)

(58) Field of Classification Search
CPC ............... H04N 5/232; H04N 5/23202; H04N 5/23206; H04N 5/23209; H04N 5/23212;
(Continued)

(56) References Cited

U.S. PATENT DOCUMENTS 6,154,610 A    11/2000 Inoue et al.
6,351,605 B1*    2/2002 Ogi et al. ...................... 396/56
(Continued)

FOREIGN PATENT DOCUMENTS

CN    101377606 A    3/2009
CN    101504508 A    8/2009
(Continued)

OTHER PUBLICATIONS

Office Action issued in JP2011-277059, mailed Nov. 10, 2015.
Office Action issued in Chinese Appln. No. 201210544722.4, dated Jun. 5, 2015. English translation provided.

*Primary Examiner* — Xi Wang
(74) *Attorney, Agent, or Firm* — Rossi, Kimms & McDowell LLP (57) ABSTRACT

A communication apparatus which is capable of, when remotely instructing an image pickup apparatus to execute a shooting operation, instructing execution of a shooting operation using a suitable method. A first sending unit sends a first signal for instructing execution of a shooting operation to a mounted image pickup apparatus via a cable connected to the mounted image pickup apparatus. A second sending unit sends a second signal for instructing execution of the shooting operation to the mounted image pickup apparatus via a signal terminal that is electrically connected to a terminal provided in an accessory shoe of the mounted image pickup apparatus. A control unit controls the first and second sending units so that, when execution of the shooting operation is instructed, a signal to be sent to the mounted image pickup apparatus is switched between the first signal and the second signal.

18 Claims, 5 Drawing Sheets

(51) Int. Cl.
  *G03B 17/00*   (2006.01)
  *H04N 5/225*   (2006.01)
  *H04N 5/235*   (2006.01)
  *G03B 15/05*   (2006.01)
  *G03B 9/70*    (2006.01)

(52) U.S. Cl.
  CPC ....... *H04N 5/2354* (2013.01); *H04N 5/23203* (2013.01)

(58) Field of Classification Search
  CPC ... H04N 5/23225; G03B 2215/05–2215/0596; G03B 7/16; G03B 15/02–15/05; G03B 9/70; G06K 9/2027; G06K 9/2036
  USPC ..... 348/207.1, 208.12, 211.99, 211.1, 211.2, 348/211.4, 211.9, 370–371, 106–110, 348/155–206; 396/56, 61, 62, 106–110, 396/155–206; 352/49, 198–203; 250/214
  See application file for complete search history.

(56) References Cited

U.S. PATENT DOCUMENTS

| | | | |
|---|---|---|---|
| 7,050,107 B1* | 5/2006 | Frank | H04N 5/2251 348/372 |
| 7,877,005 B2 | 1/2011 | Okubo | |
| 8,160,435 B2 | 4/2012 | Okubo | |
| 8,326,136 B1* | 12/2012 | Clark | G03B 15/02 396/164 |
| 2002/0140803 A1* | 10/2002 | Gutta et al. | 348/14.01 |
| 2004/0101295 A1* | 5/2004 | Clark | G03B 9/70 396/56 |
| 2005/0244151 A1* | 11/2005 | Fukui | G03B 7/16 396/48 |
| 2005/0259982 A1* | 11/2005 | Toya | G03B 15/05 396/199 |
| 2006/0158544 A1* | 7/2006 | Nakajima | H04N 1/2112 348/333.01 |
| 2009/0185797 A1* | 7/2009 | Ogasawara | G03B 15/05 396/59 |
| 2009/0196595 A1* | 8/2009 | Okubo | G03B 15/05 396/175 |
| 2011/0119409 A1* | 5/2011 | King | 710/14 |
| 2011/0123185 A1* | 5/2011 | Clark | 396/198 |
| 2012/0033959 A1* | 2/2012 | King | G03B 15/02 396/157 |

FOREIGN PATENT DOCUMENTS

| | | |
|---|---|---|
| CN | 101710922 A | 5/2010 |
| JP | 05-061109 A | 3/1993 |
| JP | 2000035611 A | 2/2000 |
| JP | 2000206600 A | 7/2000 |
| JP | 2005265983 A | 9/2005 |
| JP | 2008229276 A | 10/2008 |

* cited by examiner

COMMUNICATION APPARATUS THAT SENDS SIGNAL FOR INSTRUCTING IMAGE PICKUP APPARATUS TO EXECUTE SHOOTING OPERATION AND COMMUNICATION CONTROL METHOD THEREFOR

BACKGROUND OF THE INVENTION

Field of the Invention

The present invention relates to a communication apparatus, which can be mounted on an image pickup apparatus such as a digital camera, and a communication control method therefor.

Description of the Related Art

In general, a remote controller is used to remotely instruct an image pickup apparatus such as a digital camera or a cellular phone to execute a shooting operation.

A camera system which remotely instructs an image pickup apparatus as mentioned above to execute a shooting operation in Japanese Laid-Open Patent Publication (Kokai) No. H05-61109 uses an external strobe, which is not mounted on the image pickup apparatus, as a remote controller to remotely instruct the image pickup apparatus to execute a shooting operation. In particular, according to Japanese Laid-Open Patent Publication (Kokai) No. H05-61109, when a photometric means of the image pickup apparatus detects stroboscopic light from the external strobe which is not mounted on the image pickup apparatus, the image pickup apparatus executes a shooting operation.

The above described method (first method) that uses a remote controller to remotely instruct an image pickup apparatus to execute a shooting operation requires the image pickup apparatus to have a receiver that receives signals from the remote controller. A receiver that can be removably mounted on an image pickup apparatus should be mounted on an image pickup apparatus having no receiver, but in this case, the image pickup apparatus needs to have a controller for executing a shooting operation based on a result of receipt by the receiver.

On the other hand, as a method of remotely instructing an image pickup apparatus to execute a shooting operation, there is known a method (second method) that uses a cable (hereafter referred to as a release cable) for transmitting a signal for instructing an image pickup apparatus to execute a shooting operation (hereafter referred to as a release signal). According to this method, as long as the release cable is connectable to an image pickup apparatus, the image pickup apparatus can be remotely instructed to execute a shooting operation even when the image pickup apparatus has no receiver and no control section like the first method.

However, for conventional image pickup apparatuses, no consideration is given to how to use a plurality of methods to remotely instruct an image pickup apparatus to execute a shooting operation such as the first and second methods described above. For example, when the second method is used, an instruction to execute a shooting operation is given to an image pickup apparatus by an interrupt of a release signal, and hence the time required to start the shooting operation after a user gives the instruction is shorter as compared to the first method. On the other hand, when an instruction to execute a shooting operation is given to an image pickup apparatus by an interrupt of a release signal in a state in which a shooting preparation process such as an AF (auto-focus) process has not been completed, it can be considered that the shooting operation will not be executed because a higher priority is given to the AF process.

SUMMARY OF THE INVENTION

The present invention provides a communication apparatus which is capable of, when remotely instructing an image pickup apparatus to execute a shooting operation, instructing execution of the shooting operation by a suitable method and a communication control method therefor.

Accordingly, a first aspect of the present invention provides a communication apparatus that is removably mounted on an image pickup apparatus, comprising a first sending unit configured to send a first signal for instructing execution of a shooting operation to the mounted image pickup apparatus via a cable connected to the mounted image pickup apparatus, a second sending unit configured to send a second signal for instructing execution of the shooting operation to the mounted image pickup apparatus via a signal terminal that is electrically connected to a terminal provided in an accessory shoe of the mounted image pickup apparatus, and a control unit configured to control the first sending unit and the second sending unit so that, when execution of the shooting operation is instructed, a signal to be sent to the mounted image pickup apparatus is switched between the first signal and the second signal.

Accordingly, a second aspect of the present invention provides a communication apparatus that is removably mounted on an image pickup apparatus, comprising a first sending unit configured to send a first signal for instructing execution of a shooting operation to the mounted image pickup apparatus without involving a signal terminal that is electrically connected to a terminal provided in an accessory shoe of a mounted image pickup apparatus, a second sending unit configured to send a second signal for instructing execution of the shooting operation to the mounted image pickup apparatus via the signal terminal, and a control unit configured to control the first sending unit and the second sending unit so that, when execution of the shooting operation is instructed, a signal to be sent to the mounted image pickup apparatus is switched between the first signal and the second signal.

Accordingly, a third aspect of the present invention provides a communication control method for a communication apparatus that is removably mounted on an image pickup apparatus and sends a signal for instructing execution of a shooting operation to the image pickup apparatus, comprising a switching step of switching a signal to be sent to a mounted image pickup apparatus between a first signal and a second signal when execution of the shooting operation is instructed, wherein the first signal is a signal to be sent to the mounted image pickup apparatus via a cable connected to the communication apparatus, and wherein the second signal is a signal to be sent to the mounted image pickup apparatus via a signal terminal that is electrically connected to a terminal provided in an accessory shoe of the mounted image pickup apparatus.

Accordingly, a fourth aspect of the present invention provides a communication control method for a communication apparatus that is removably mounted on an image pickup apparatus and sends a signal for instructing execution of a shooting operation to the image pickup apparatus, comprising a switching step of switching a signal to be sent to the mounted image pickup apparatus between a first signal and a second signal when execution of the shooting operation is instructed, wherein the first signal is a signal to be sent to the mounted image pickup apparatus without involving a signal terminal that is electrically connected to a terminal provided in an accessory shoe of the mounted image pickup apparatus, and wherein the second signal is a signal to be sent to the mounted image pickup apparatus via the signal terminal that is electrically connected to the terminal provided in the accessory shoe of the mounted image pickup apparatus.

According to the present invention, when an image pickup apparatus is to be remotely instructed to execute a shooting operation, execution of the shooting operation can be instructed by a method suitable for a state of the image pickup apparatus.

Further features of the present invention will become apparent from the following description of exemplary embodiments (with reference to the attached drawings).

DESCRIPTION OF THE EMBODIMENTS

The present invention will now be described in detail with reference to the drawings showing embodiments thereof.

Figure 1:
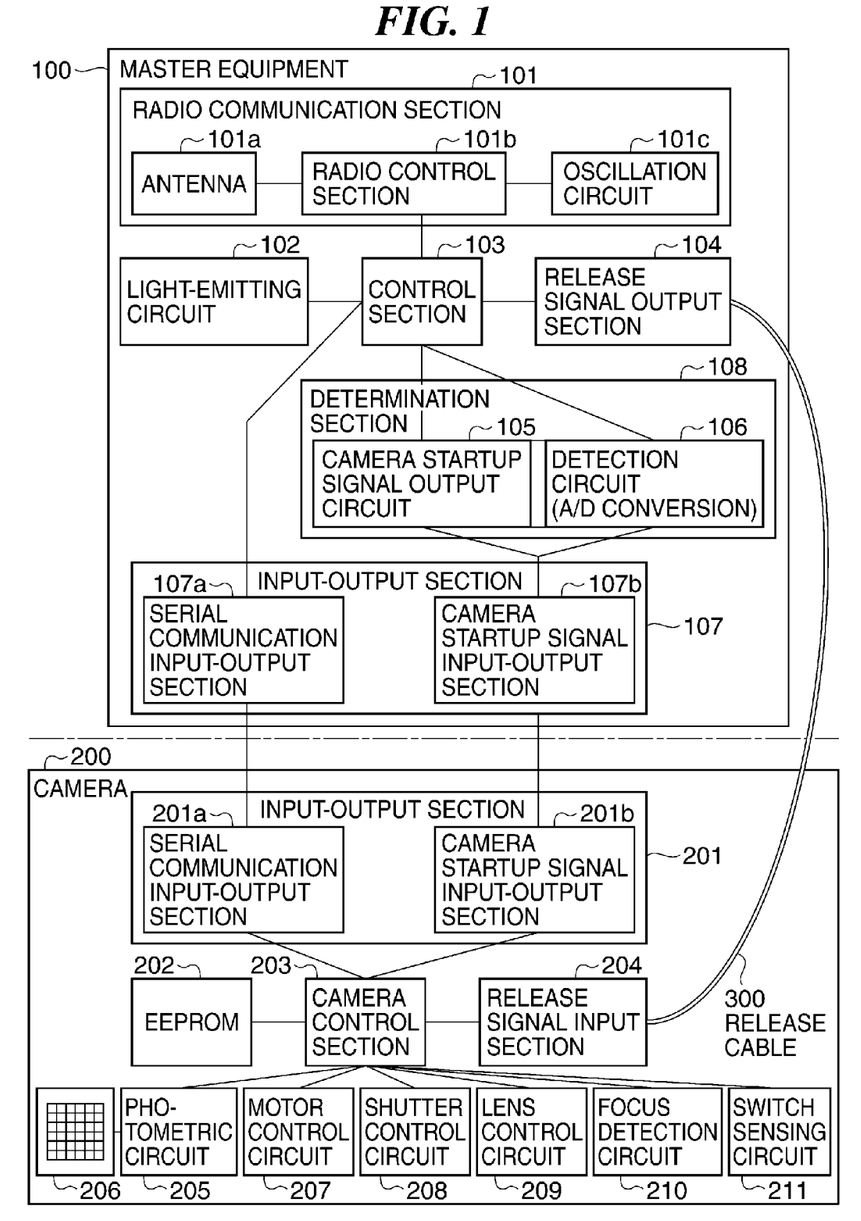
FIG. 1 is a block diagram showing a camera system according to a first embodiment.

FIG. 1 is a block diagram showing a camera system according to a first embodiment.

The camera system shown in FIG. 1 includes a strobe apparatus 100, which is a communication apparatus, and a camera 200 which is an image pickup apparatus, and a release cable 300 is connected to the strobe apparatus 100 and the camera 200. It should be noted that the camera 200 has a standby mode (standby state) in which it can perform shooting, and a sleep mode (sleep state) in which it consumes less electric power than in the standby mode.

First, a description will be given of an arrangement of the strobe apparatus 100. The strobe apparatus 100 has a light-emitting circuit 102, which becomes charged under the control of a control section 103. Also, in response to a light-emitting instruction from the control section 103, the light-emitting circuit 102 causes a light-emitting section included in the light emitting circuit 102 to emit light. When charging is completed, the light-emitting circuit 102 sends a charging completion signal to the control section 103.

In response to a release signal sending instruction from the control section 103, a release signal output section 104 (first sending unit) sends a release signal (first signal), which is a signal indicative of an instruction to execute a shooting operation, to a camera control section 203 via the release cable 300.

A determination section 108 has a camera startup signal output circuit 105 and a detection circuit 106, and an input-output section 107 has a serial communication input-output section 107a and a camera startup signal input-output section 107b.

In response to a camera startup instruction from the control section 103, the camera startup signal output circuit 105 sends a camera startup signal to the camera startup signal input-output section 107b. Upon receiving a voltage level measuring instruction from the control section 103, the detection circuit 106 detects a voltage level of the camera startup signal input-output section 107b and sends the detection result to the control section 103. Based on the detection result from the detection circuit 106, the control section 103 determines whether or not the camera 200 can be caused to start a shooting operation by serial communication via the serial communication input-output section 107a as will be described later.

The serial communication input-output section 107a (second sending unit) is an interface for carrying out data communications with the camera 200, and the camera startup signal input-output section 107b is an interface for inputting and outputting a camera startup signal to and from the camera 200. The serial communication input-output section 107a sends a release notification (second signal), which is a signal indicative of an instruction to execute a shooting operation, to the camera control section 203 via a signal terminal electrically connected to a terminal provided in an accessory shoe of the mounted camera 200.

The strobe apparatus 100 has a radio communication section 101 (radio communication unit), which performs radio communication with an external apparatus and has an antenna 101a, a radio control section 101b, and an oscillation circuit 101c. The oscillation circuit 101c generates a clock signal according to an oscillation frequency of a crystal oscillator (not shown) and supplies the clock signal to the radio control section 101b. The radio control section 101b operates in accordance with the clock signal to send and receive data by radio waves via the antenna 101a.

Next, a description will be given of an arrangement of the camera 200. The camera 200 has the camera control section 203 which is responsible for controlling the entire camera 200. Adjustment data, which is used by the camera control section 203 when it controls the camera 200, or the like is stored in a memory 202 (for example, an EEPROM).

Further, the camera 200 has a release signal input section 204 and an input-output section 201. The input-output section 201 has a serial communication input-output section 201a and a camera startup signal input-output section 201b. The input-output section 201 is an input-output section between the camera 200 and the strobe apparatus 100, and the serial communication input-output section 201a is connected to the serial communication input-output section 107a via the signal terminal electrically connected to the terminal provided in the accessory shoe. The camera startup signal input-output section 201b is connected to the camera startup signal input-output section 107b via the signal terminal electrically connected to the terminal provided in the accessory shoe.

Upon receiving a release signal from the strobe apparatus 100 via the release cable 300, the release signal input section 204 sends a camera startup instruction and a shooting instruction to the camera control section 203. In response to the camera startup instruction and the shooting instruction, the camera control section 203 starts a shooting operation. On this occasion, when the camera 200 is in the sleep mode, the camera control section 203 brings the camera 200 into a startup state (the standby mode) in accordance with the camera startup instruction, and thereafter, starts the shooting operation in accordance with the shooting instruction.

Further, when the camera 200 is set in a state in which it allows the strobe apparatus 100 to fire the flash (flash firing allowed state), the camera control section 203 sends a flash firing instruction to the serial communication input-output section 201a. As a result, in the strobe apparatus 100, the control section 103 receives the flash firing instruction via the serial communication input-output section 201a and controls the light-emitting circuit 102 to fire the flash.

The camera 200 has a photometric circuit 205, to which a multifractionated photometric sensor 206 is connected. The multifractionated photometric sensor 206 has a shooting screen thereof divided into a plurality of areas, obtains photometric values on an area-by-area basis, and sends the photometric values to the camera control section 203.

The camera control section 203 converts the photometric values into digital signals by an A/D converter (not shown) to obtain aperture values for adjusting exposures according to the digital signals, and also obtains shutter speed and the amount of luminescence by main flash firing. A motor control circuit 207 drivingly controls a motor at the time of exposure under the control of the camera control section 203 to move up and down a mirror (not shown) and charges a shutter (not shown).

A shutter control circuit 208 controls a front curtain of the shutter and a rear curtain of the shutter under the control of the camera control section 203. A lens control circuit 209 communicates with the camera control section 203 via a lens mount contact (not shown) to perform lens focus adjustment and aperture control by driving a lens drive motor and a lens diaphragm motor (neither of them shown).

A focus detection circuit 210 detects the amount of defocus with respect to a subject in a plurality of focus detection areas. The camera 200 also has a selection switch (not shown) for selecting one of AF and MF (manual focus). When MF is selected by the selection switch, the camera control section 203 disables the detecting function of the focus detection circuit 210.

It should be noted that operations of the selection switch and an operating section (not shown) provided in the camera 200 are detected by a switch sensing circuit 211, and operation signals are sent from the switch sensing circuit 211 to the camera control section 203.

Figure 2:
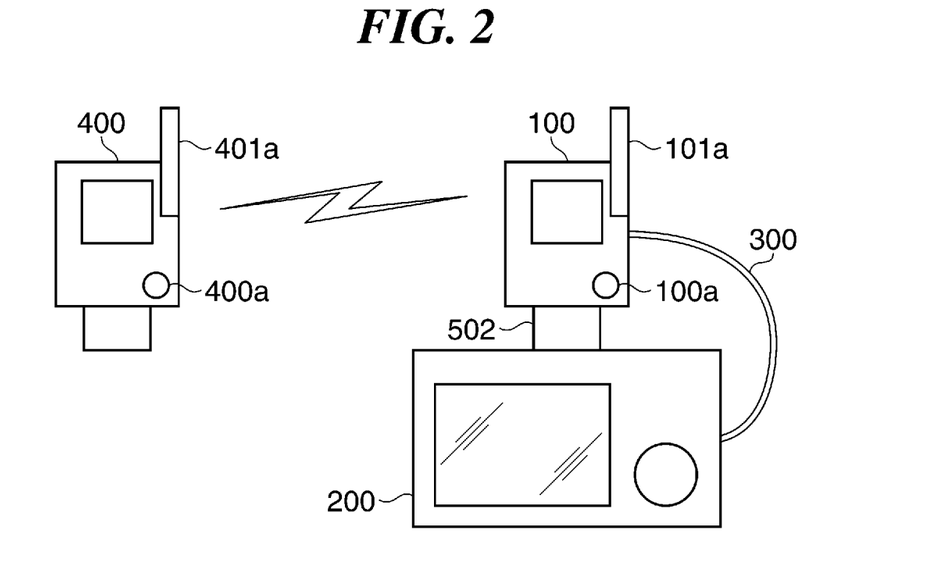
FIG. 2 is a view schematically showing an arrangement of the camera system according to the first embodiment.

FIG. 2 is a view schematically showing an arrangement of the camera system appearing in FIG. 1.

Referring to FIG. 2, the camera 200 is equipped with a connecting section 502, by which the strobe apparatus 100 is removably mounted on the camera 200. The strobe apparatus 100 being removably mounted on the camera 200 by the connecting section 502 connects the input-output sections 107 and 201 appearing in FIG. 1 to each other.

In the example shown in FIG. 2, the strobe apparatus 100 is connected to a strobe apparatus 400 by radio. In the following description, the strobe apparatus 100 will also be referred to as the master strobe, and the strobe apparatus 400 will also be referred to as the slave strobe.

It should be noted that an arrangement of the slave strobe 400 is the same as that of the master strobe 100, and an antenna in the slave strobe 400 is designated by a reference symbol 401a. The master strobe 100 and the slave strobe 400 are equipped with respective release switches 100a and 400a.

Referring to FIG. 2, when the release switch 400a is operated in the slave strobe 400, a notification relating to an instruction to execute a shooting operation (hereafter referred to as a release notification) is supplied from the slave strobe 400 to the master strobe 100 by radio communication. Then, in the above described manner, a release signal is supplied from the master strobe 100 to the camera 200 via the release cable 300. When the release switch 100a is operated in the master strobe 100, a release signal is supplied to the camera 200 via the release cable 300.

Figure 3:
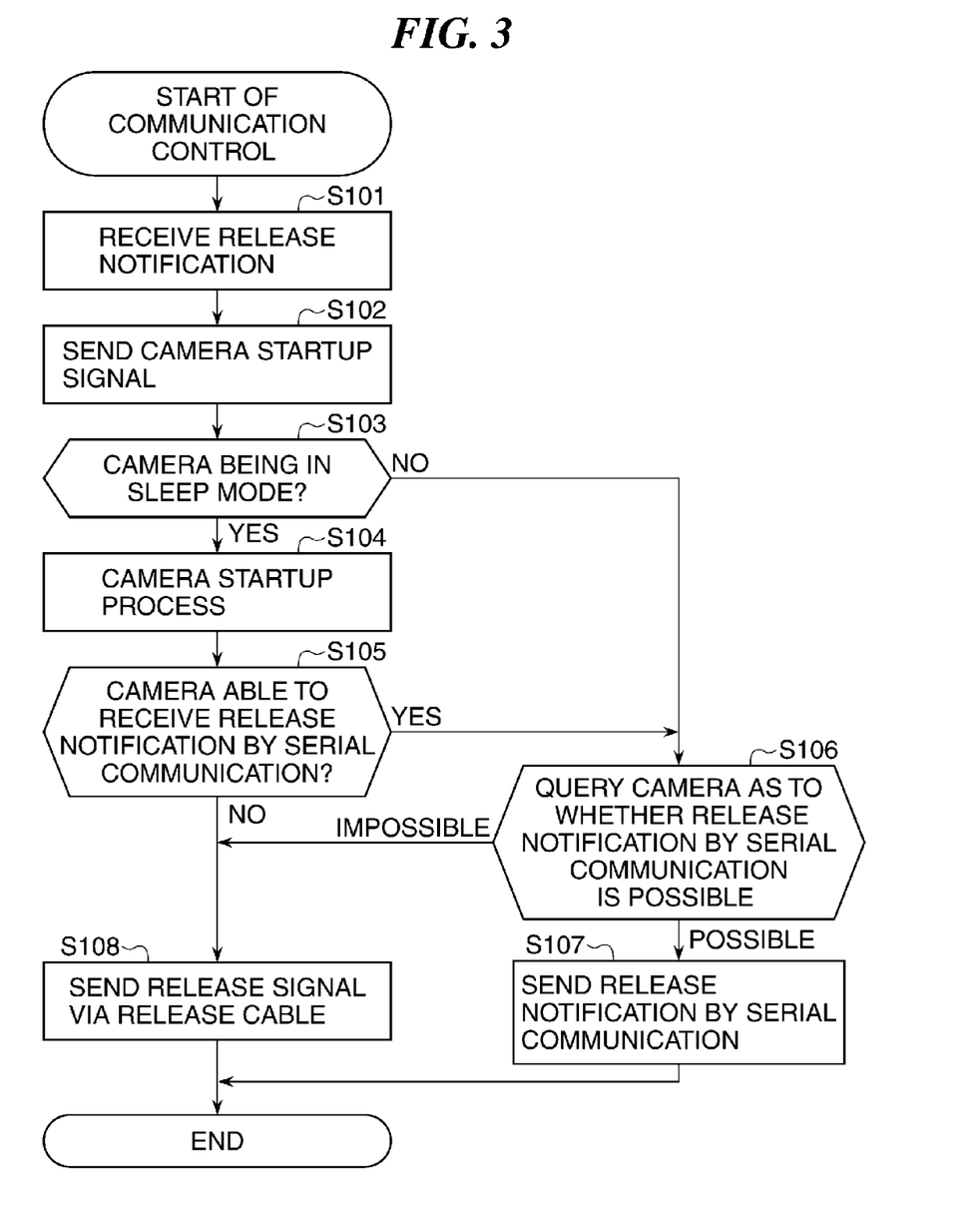
FIG. 3 is a flowchart useful in explaining communication control according to the first embodiment.

Referring next to FIG. 3, a description will be given of communication control by the master strobe 100.

In response to a release notification supplied from the slave strobe 400 by radio communication, the master strobe 100 starts the flowchart in FIG. 3.

First, the master strobe 100 receives a release notification from the slave strobe 400 (external apparatus) by radio communication (step S101).

Upon receiving the release notification, a radio control section 101b sends the release notification to the control section 103. In response to the release notification, the control section 103 controls the camera startup signal output circuit 105 to send a camera startup signal to the camera 200 via the camera startup signal input-output section 107b (step S102).

Upon receiving the camera startup signal, the camera control section 203 determines whether or not the camera 200 is in the sleep mode (step S103). When the camera 200 is in the sleep mode (YES in the step S103), the camera control section 203 carries out a camera startup process in which it brings the camera 200 into the standby mode (step S104).

Then, the control section 103 determines whether or not a voltage level of the camera startup signal input-output section 107b detected by the detection circuit 106 is equal to or more than a predetermined level (equal to or more than a threshold value). Namely, by referring to the voltage level, the control section 103 determines whether or not a release notification can be sent from the master strobe 100 to the camera 200 by serial communication using the serial communication input-output sections 107a and 201a (step S105).

When the voltage level, which is information on the camera 200, is equal to or more than the predetermined level, the control section 103 determines that sending of a release notification by serial communication is possible.

When the control section 103 determines that sending of a release notification by serial communication is possible (YES in the step S105), the control section 103 queries, by serial communication, the camera control section 203 as to whether or not sending of a release notification by serial communication is possible (step S106). Upon receiving from the camera consol section 203 information on the camera 200 as to whether the camera 200 can execute a shooting operation in response to the release notification ("possible" in the step S106), the control section 103 sends a release notification to the camera control section 203 by serial communication (step S107). In the case where a release notification is to be sent by serial communication, the release notification is sent to the camera control section 203 after it is ascertained that sending of the release notification by serial communication is possible, and therefore, the camera 200 can be reliably caused to execute a shooting operation.

Then, the control section 103 terminates the communication control. The camera control section 203 executes a shooting operation in accordance with the release notification from the control section 103.

On the other hand, when the camera control section 203 receives a notification that sending of release notification by serial communication is impossible or receives no notification even when a predetermined time period has elapsed ("impossible" in the step S106), the control section 103 proceeds to a process in step S108. Then, the control section 103 sends a release signal to the camera 200 from the release signal output section 104 via the release cable 300 (step S108).

When a release signal is to be sent via the release cable, execution of a shooting operation is instructed by an interrupt, and hence release time lag can be shortened.

Then, the control section 103 terminates the release notification control. The camera 200 receives the release signal by the release signal input section 204, and the camera consol section 203 carries out a shooting process in response to the release signal.

It should be noted that when the camera 200 is not in the sleep mode in the step S103 (NO in the step S103), the control section 103 proceeds to the process in the step S106. When the voltage level is less than the predetermined level in the step S105 (NO in the step S105), the control section 103 proceeds to the process in the step S108.

As described above, in the present embodiment, the way of instructing execution of a shooting operation is selected according to a state of the camera 200 and a state in which the camera 200 and the master strobe 100 are connected together. Specifically, a signal to be sent when execution of a shooting operation is instructed is switched between a release signal output from the release signal output section 104 and a release notification output from the serial communication input-output section 107a, and as a result, execution of a shooting operation can be instructed by a method suitable for a state of the camera 200.

Figure 4:
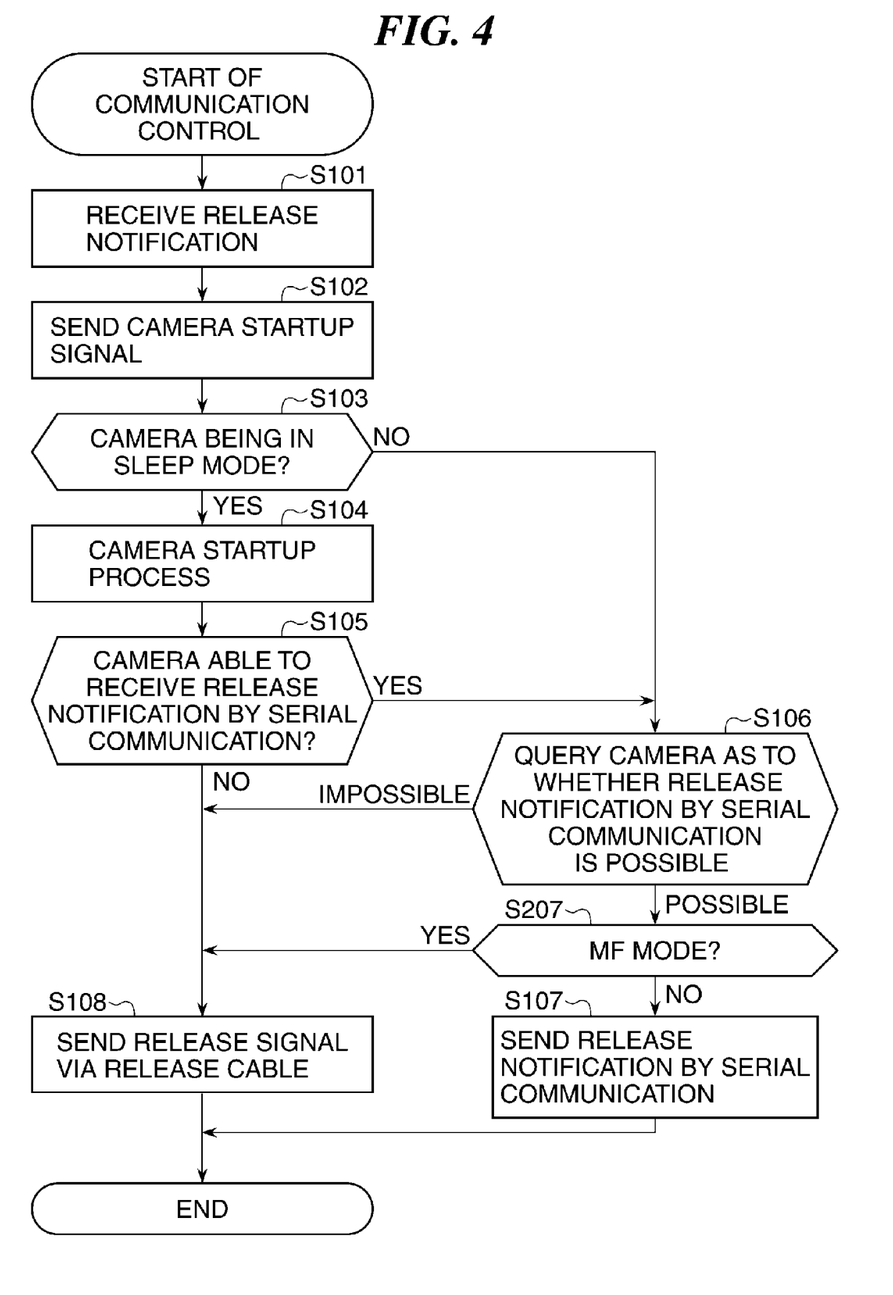
FIG. 4 is a flowchart useful in explaining communication control according to a second embodiment.

Referring next to FIG. 4, a description will be given of communication control according to a second embodiment. It should be noted that a camera system according to the second embodiment is the same as the camera system appearing in FIGS. 1 and 2, and therefore, description thereof is omitted.

FIG. 4 is a flowchart useful in explaining communication control by the master strobe 100 according to the present embodiment. In response to a release notification supplied from the slave strobe 400 by radio communication, the master strobe 100 starts the flowchart in FIG. 4. It should be noted that in FIG. 4, the same steps as those in the flowchart of FIG. 3 are designated by the same reference symbols, and description thereof is omitted.

Upon receiving, in the step S106, a notification that sending of a release notification by serial communication is possible ("possible" in the step S106), the control section 103 proceeds to step S207. Then, by serial communication, the control section 103 queries the camera control section 203 as to whether a focus control mode is an AF mode (auto-focus mode) or an MF mode (manual focus mode). Based on a result of the query, the control section 103 determines whether or not the camera 200 is in the MF mode (step S207).

Upon receiving a notification that the camera 200 is in the AF mode, which is information on the focus control mode, from the camera control section 203 by serial communication (NO in the step S207), the control section 103 carries out the process in the step S107. On the other hand, upon receiving a notification that the camera 200 is in the MF mode from the camera control section 203 by serial communication (YES in the step S207), the control section 103 carries out the process in the step S108.

As described above, in the present embodiment, when the camera 200 is in the MF mode, a release signal is sent via the release cable to send an instruction to start a shooting operation even when sending of a release notification by serial communication is possible. This is because when the camera 200 is in the MF mode, an AF process given a higher priority than an instruction to start a shooting operation using a release signal is not carried out, and hence even when starting of a shooting operation is instructed using a release signal, the camera 200 can be reliably caused to perform a release operation. Considering that a release signal has higher immediacy than a release notification by serial communication, the reliability of instruction to start a shooting operation and the immediacy of a shooting operation can be enhanced by instructing starting of a shooting operation using a release signal in the MF mode.

Figure 5:
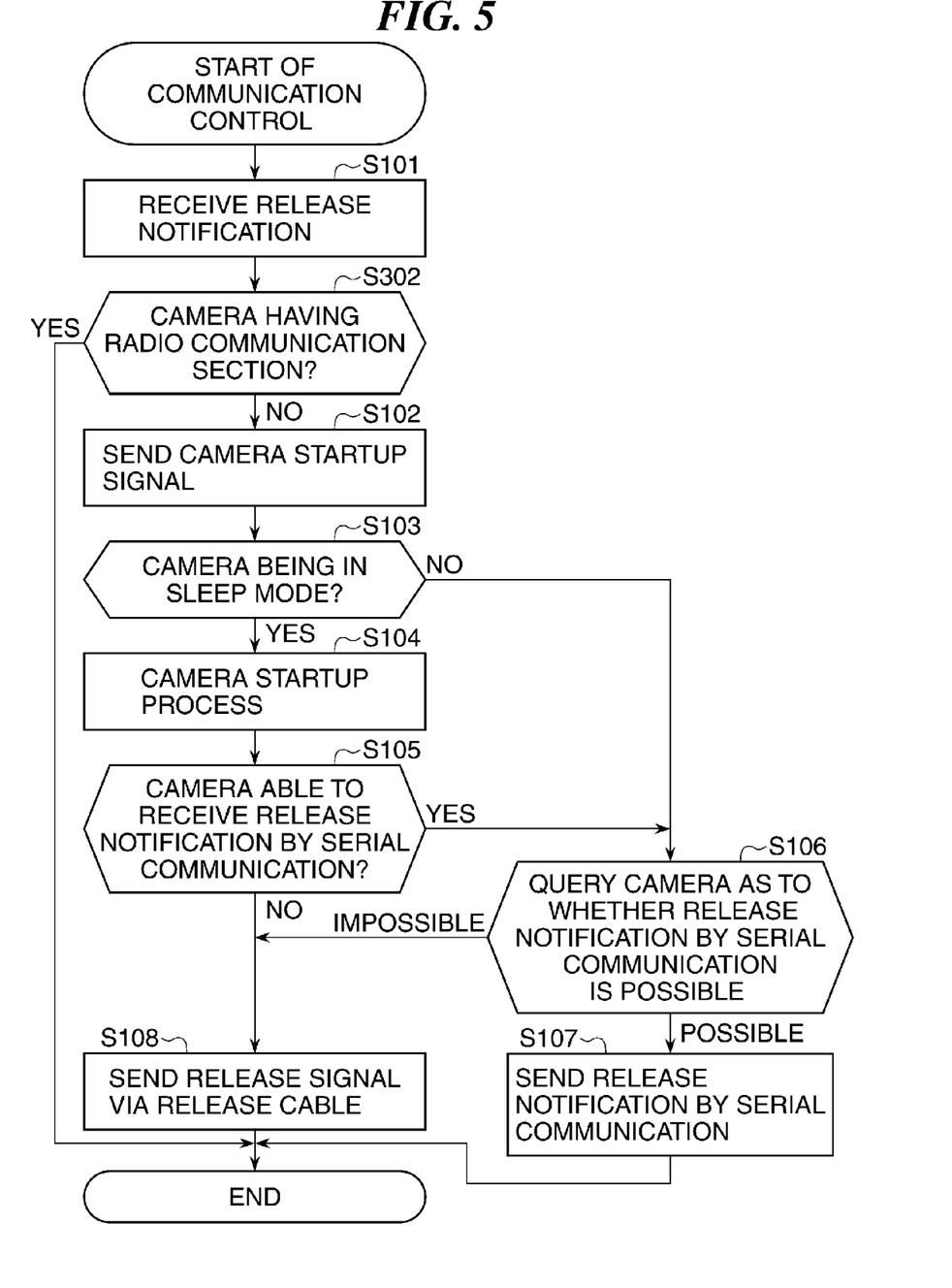
FIG. 5 is a flowchart useful in explaining communication control according to a third embodiment.

Referring next to FIG. 5, a description will be given of communication control according to a third embodiment. It should be noted that a camera system according to the third embodiment differs from the camera system appearing in FIG. 1 in that the camera 200 has a radio communication function (radio communication section: not shown). In other respects, the camera system according to the third embodiment is the same as the camera system appearing in FIGS. 1 and 2, and therefore, description thereof is omitted.

FIG. 5 is a flowchart useful in explaining communication control by the master strobe 100 according to the present embodiment. In response to a release notification supplied from the slave strobe 400 by radio communication, the master strobe 100 starts the flowchart in FIG. 5. It should be noted that in FIG. 5, the same steps as those in the flowchart of FIG. 3 are designated by the same reference symbols, and description thereof is omitted.

When the camera 200 has the radio communication function, the camera 200 has only to directly receive a release notification from the slave strobe 400 even when the camera 200 has the master strobe 100 mounted thereon. However, in the case where the camera 200 directly receives a release notification from the slave strobe 400, if the camera 200 receives a release notification or a release signal from the master strobe 100, the camera 200 receives a plurality of instructions to start a shooting operation, and as a result, the camera 200 will execute the shooting operation more than once.

Thus, when the master strobe 100 receives a release notification from the slave strobe 400 by radio communication in the step S101, the control section 103 queries the camera control section 203 as to whether or not the camera 200 is equipped with a radio communication section. Then, based on a result of the query, the control section 103 determines whether or not the camera 200 has a radio communication section (step S302).

In response to a notification that the camera 200 has a radio communication section from the camera control section 203 (YES in the step S302), the control section 103 terminates the communication control. Namely, the control section 103 operates neither the release signal output section 104 nor the serial communication input-output section 107a, and does not cause the release signal output section 104 and the serial communication input-output section 107a to send a signal for instructing execution of a shooting operation to the camera 200.

On the other hand, upon receiving, from the camera control unit 203, a notification that the camera 200 has no radio communication section, or when receiving no notification until elapse of a predetermined time period (NO in the step S302), the control unit 103 proceeds to the process in the step S102.

As described above, in the present embodiment, according to whether or not the camera 200 has a radio communication function, the master strobe 100 determines whether or not to instruct the camera 200 to start a shooting operation. Thus, when the camera 200 has a radio communication function, the camera 200 directly receives a release notification from only the slave strobe 400 by radio communication, and hence the camera 200 can be prevented from executing a shooting operation more than once.

It should be noted that although in the three embodiments described above, whether or not the camera 200 is a camera that can be caused to start a shooting operation by serial communication is determined in the steps S105 and S106, this determination may be carried out only in one of these two steps. In this case, the determination should be carried out irrespective of whether or not the camera 200 is in the sleep mode.

Moreover, although the three embodiments described above have been described based on the assumption that the release cable 300 is connected to the master strobe 100 and the camera 200, a process to determine whether or not the release cable 300 is connected to the master strobe 100 and the camera 200 may be carried out. When the release cable 300 is not connected to the master strobe 100 and the camera 200, a release notification should be sent by serial communication if the camera 200 is a camera that can be caused to start a shooting operation by serial communication. When the release cable 300 is not connected to the master strobe 100 and the camera 200, and the camera 200 is a camera that cannot be caused to start a shooting operation by serial communication, a warning to the effect that the camera 200 cannot be remotely instructed to execute a shooting operation should be issued.

Further, although in the descriptions of the three embodiments described above, a release notification is sent from the slave strobe 400 to the master strobe 100 by radio communication using radio waves, a release notification may be sent by radio communication such as infrared communication or light pulse communication.

In addition, although in the three embodiments described above, a strobe apparatus capable of carrying out radio communications is used as a communication apparatus, the present invention may be applied to electronic apparatus which is capable of carrying out radio communications and has no light-emitting unit such as a strobe apparatus.

Moreover, the processes in the steps S103 and S104 may be dispensed with, and the present invention may be applied to a case where the camera 200 is an image pickup apparatus that does not have the sleep mode.

Furthermore, in the above three embodiments, an arrangement in which a release signal indicative of an execution instruction for a shooting operation is send to the camera control section 203 via the release cable 300 is described. However, if the release cable 300 is not used, the present invention can applied to an arrangement that has a sending unit for sending a release signal to the camera control section 203 without involving a signal terminal electrically connected to a terminal provided in the accessory shoe of the camera 200. For example, the present invention can be applied to an arrangement in which a sending unit that sends a release signal to the camera control section 203 using infrared communication or light pulse communication is used instead of using the release cable 300.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-277059 filed Dec. 19, 2011, which is hereby incorporated by reference herein in its entirety.

What is claimed is:

1. A communication apparatus configured to be removably mounted on an image pickup apparatus, comprising:
   a memory device; and
   a processor configured to execute computer executable instructions recorded on the memory device, the computer executable instructions including instructions, that when executed by the processor, cause the communication apparatus to:
   send a first signal for instructing execution of a shooting operation to the image pickup apparatus via a cable connected to the image pickup apparatus;
   send a second signal for instructing execution of the shooting operation to the image pickup apparatus via a signal terminal that is electrically connected to a terminal provided in an accessory shoe of the image pickup apparatus; and
   control, according to a state of the image pickup apparatus, the communication apparatus to send either the first signal or the second signal to the image pickup apparatus to instruct execution of the shooting operation,
   wherein information as to whether the image pickup apparatus can execute the shooting operation in response to the second signal is obtained via the signal terminal, and
   wherein in a case where the image pickup apparatus is able to receive the first signal via the cable and communicate with the communication apparatus via the terminal provided in the accessory shoe, a signal to be sent to the image pickup apparatus when execution of the shooting operation is instructed is switched between the first signal and the second signal based on the obtained information.

2. The communication apparatus according to claim 1, wherein in a case where the obtained information indicates that the image pickup apparatus cannot execute the shooting operation in response to the second signal, the communication apparatus is caused to send the first signal to the image pickup apparatus.

3. The communication apparatus according to claim 1, wherein in a case where the obtained information indicates the image pickup apparatus can execute the shooting operation in response to the second signal, the communication apparatus is caused to send the second signal to the image pickup apparatus.

4. The communication apparatus according to claim 1, wherein the second signal is sent to the image pickup apparatus via the signal terminal by serial communication.

5. The communication apparatus according to claim 1, wherein the computer executable instructions further include instructions, that when executed by the processor, cause the communication apparatus to carry out radio communications with an external apparatus, and
   wherein in a case where a signal is received from the external apparatus, the communication apparatus is caused to send, based on the received signal, either the first signal or the second signal to the mounted image pickup apparatus.

6. The communication apparatus according to claim 5, wherein in a case where the image pickup apparatus is connected to the cable, information as to whether the image pickup apparatus can carry out radio communications is obtained, and based on the obtained information regarding whether the image pickup apparatus can carry out radio communications, a signal to be sent to the image pickup apparatus when execution of the shooting operation is instructed is switched between the first signal and the second signal.

7. The communication apparatus according to claim 6, wherein in a case where the mounted image pickup apparatus is connected to the cable and the image pickup apparatus can carry out radio communications, neither of the first signal and the second signal is sent.

8. The communication apparatus according to claim 1, wherein in a case where the communication apparatus is not mounted on the image pickup apparatus, the communication apparatus is caused to send a release notification to the image pickup apparatus by radio communication.

9. The communication apparatus according to claim 1, wherein the information as to whether the image pickup apparatus can execute the shooting operation in response to the second signal is obtained via the signal terminal in a case where the image pickup apparatus is able to communicate with the communication apparatus via the terminal provided in the accessory shoe.

10. The communication apparatus according to claim 9, wherein the information as to whether the image pickup apparatus can execute the shooting operation in response to the second signal is not obtained in a case where the image pickup apparatus is not able to communicate with the communication apparatus via the terminal provided in the accessory shoe.

11. The communication apparatus according to claim 1, wherein the information as to whether the image pickup apparatus can execute the shooting operation in response to the second signal is obtained via the signal terminal in response to receipt of a release notification instructing execution of the shooting operation.

12. A communication apparatus configured to be removably mounted on an image pickup apparatus, comprising:
 a memory device; and
 a processor configured to execute computer executable instructions recorded on the memory device, the computer executable instructions including instructions, that when executed by the processor, cause the communication apparatus to:
 send a first signal for instructing execution of a shooting operation to the image pickup apparatus via a cable connected to the image pickup apparatus;
 send a second signal for instructing execution of the shooting operation to the image pickup apparatus via a signal terminal that is electrically connected to a terminal provided in an accessory shoe of the image pickup apparatus; and
 control, according to a state of the image pickup apparatus, the communication apparatus to send either the first signal or the second signal to the image pickup apparatus to instruct execution of the shooting operation,
 wherein in a case where the image pickup apparatus is connected to the cable, able to communicate with the communication apparatus via the terminal provided in the accessory shoe, and in a manual focus mode, the communication apparatus is caused to send the first signal to the image pickup apparatus.

13. A communication apparatus configured to be removably mounted on an image pickup apparatus, comprising:
 a memory device; and
 a processor configured to execute computer executable instructions recorded on the memory device, the computer executable instructions including instructions, that when executed by the processor, cause the communication apparatus to:
 send a first signal for instructing execution of a shooting operation to the image pickup apparatus via a cable connected to the image pickup apparatus;
 send a second signal for instructing execution of the shooting operation to the image pickup apparatus via a signal terminal that is electrically connected to a terminal provided in an accessory shoe of the image pickup apparatus; and
 control, according to a state of the image pickup apparatus, the communication apparatus to send either the first signal or the second signal to the image pickup apparatus to instruct execution of the shooting operation,
 wherein in a case where the image pickup apparatus is connected to the cable and the image pickup apparatus is in an auto focus mode, the communication apparatus is caused to send the second signal to the image pickup apparatus.

14. A communication apparatus configured to be removably mounted on an image pickup apparatus, comprising:
 a memory device; and
 a processor configured to execute computer executable instructions recorded on the memory device, the computer executable instructions including instructions, that when executed by the processor, cause the communication apparatus to:
 send a first signal for instructing execution of a shooting operation to the image pickup apparatus without involving a signal terminal that is electrically connected to a terminal provided in an accessory shoe of the image pickup apparatus;
 send a second signal for instructing execution of the shooting operation to the image pickup apparatus via the signal terminal; and
 control, according to a state of the image pickup apparatus, the communication apparatus to send either the first signal or the second signal to the image pickup apparatus to instruct execution of the shooting operation,
 wherein information as to whether the image pickup apparatus can execute the shooting operation in response to the second signal is obtained via the signal terminal, and
 wherein in a case where the image pickup apparatus is able to receive the first signal and communicate with the communication apparatus via the terminal provided in the accessory shoe, a signal to be sent to the image pickup apparatus when execution of the shooting operation is instructed is switched between the first signal and the second signal based on the obtained information.

15. A method for a communication apparatus configured to be removably mounted on an image pickup apparatus and to send a signal for instructing execution of a shooting operation to the image pickup apparatus, comprising:
 sending, according to a state of the image pickup apparatus, either a first signal or a second signal to the image pickup apparatus to instruct execution of the shooting operation, wherein the first signal is a signal to be sent to the image pickup apparatus via a cable connected to the communication apparatus, wherein the second signal is a signal to be sent to the image pickup apparatus via a signal terminal that is electrically connected to a terminal provided in an accessory shoe of the image pickup apparatus, wherein information as to whether the image pickup apparatus can execute the shooting operation in response to the second signal is obtained via the signal terminal, and wherein in a case where the image pickup apparatus is able to receive the first signal via the cable and communicate with the communication apparatus via the terminal provided in the accessory shoe, a signal to be sent to the image pickup apparatus when execution of the shooting operation is instructed is switched between the first signal and the second signal based on the obtained information.

16. A method for a communication apparatus configured to be removably mounted on an image pickup apparatus and to send a signal for instructing execution of a shooting operation to the image pickup apparatus, comprising:

sending, according to a state of the image pickup apparatus, either a first signal or a second signal to the image pickup apparatus to instruct execution of the shooting operation, wherein the first signal is a signal to be sent to the image pickup apparatus via a cable connected to the image pickup apparatus, wherein the second signal is a signal to be sent to the image pickup apparatus via a signal terminal that is electrically connected to a terminal provided in an accessory shoe of the image pickup apparatus, and wherein in a case where the image pickup apparatus is connected to the cable, able to communicate with the communication apparatus via the terminal provided in the accessory shoe, and in a manual focus mode, the first signal is sent to the image pickup apparatus.

17. A communication control method for a communication apparatus configured to be removably mounted on an image pickup apparatus and to send a signal to the image pickup apparatus, comprising:

sending, according to a state of the image pickup apparatus, either a first signal or a second signal to the image pickup apparatus, wherein the first signal is a signal to be sent to the image pickup apparatus via a cable connected to the image pickup apparatus, wherein the second signal is a signal to be sent to the image pickup apparatus via a signal terminal that is electrically connected to a terminal provided in an accessory shoe of the image pickup apparatus, and wherein in a case where the image pickup apparatus is connected to the cable and the image pickup apparatus is in an auto focus mode, the second signal is sent to the image pickup apparatus.

18. A communication control method for a communication apparatus configured to be removably mounted on an image pickup apparatus and to send a signal to the image pickup apparatus, comprising:

sending, according to a state of the image pickup apparatus, either a first signal or a second signal to the image pickup apparatus, wherein the first signal is a signal to be sent to the image pickup apparatus without involving a signal terminal that is electrically connected to a terminal provided in an accessory shoe of the image pickup apparatus, wherein the second signal is a signal to be sent to the image pickup apparatus via the signal terminal, wherein information as to whether the image pickup apparatus can execute the shooting operation in response to the second signal is obtained via the signal terminal, and wherein in a case where the image pickup apparatus is able to receive the first signal and communicate with the communication apparatus via the terminal provided in the accessory shoe, a signal to be sent to the image pickup apparatus when execution of the shooting operation is instructed is switched between the first signal and the second signal based on the obtained information.

* * * * *